May 1, 1923. 1,453,768
W. T. ROBBINS
ANIMAL CONTROL FEEDER
Filed Jan. 16, 1923 2 Sheets-Sheet 1
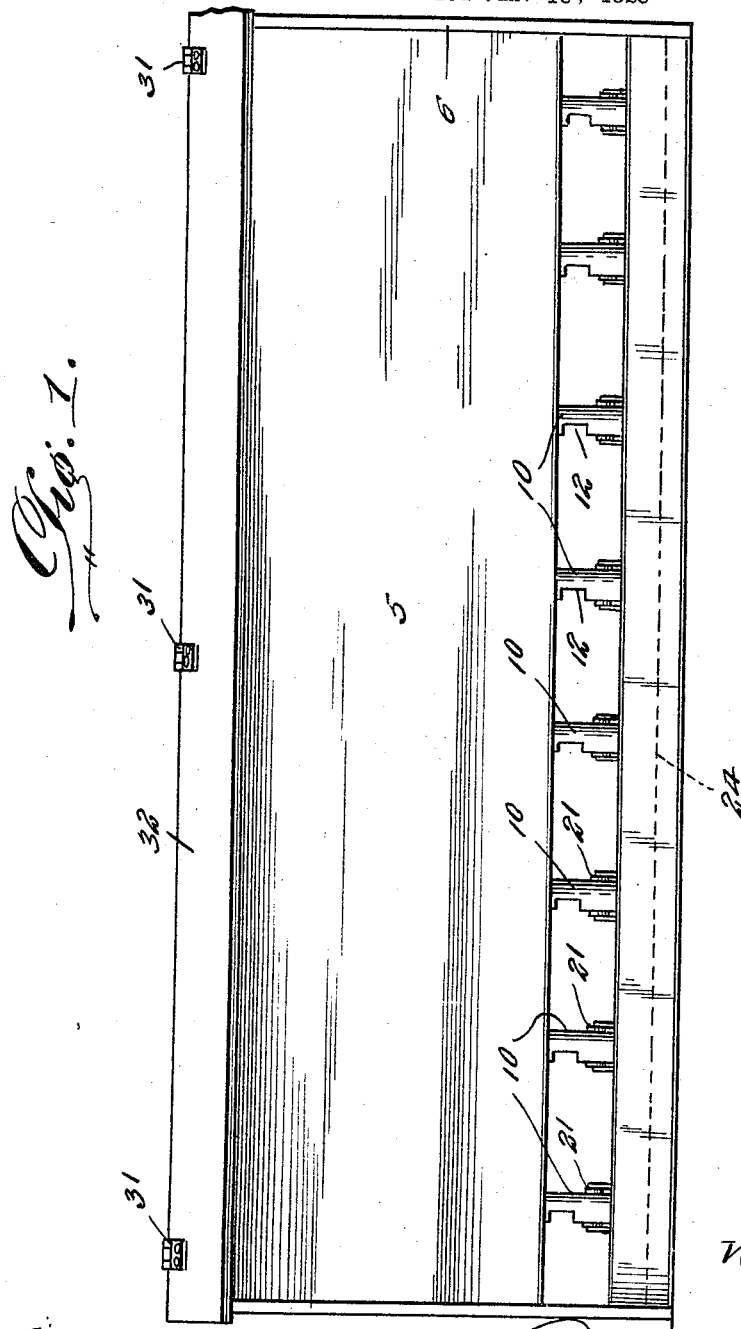

May 1, 1923.
W. T. ROBBINS
ANIMAL CONTROL FEEDER
Filed Jan. 16, 1923
1,453,768
2 Sheets-Sheet 2
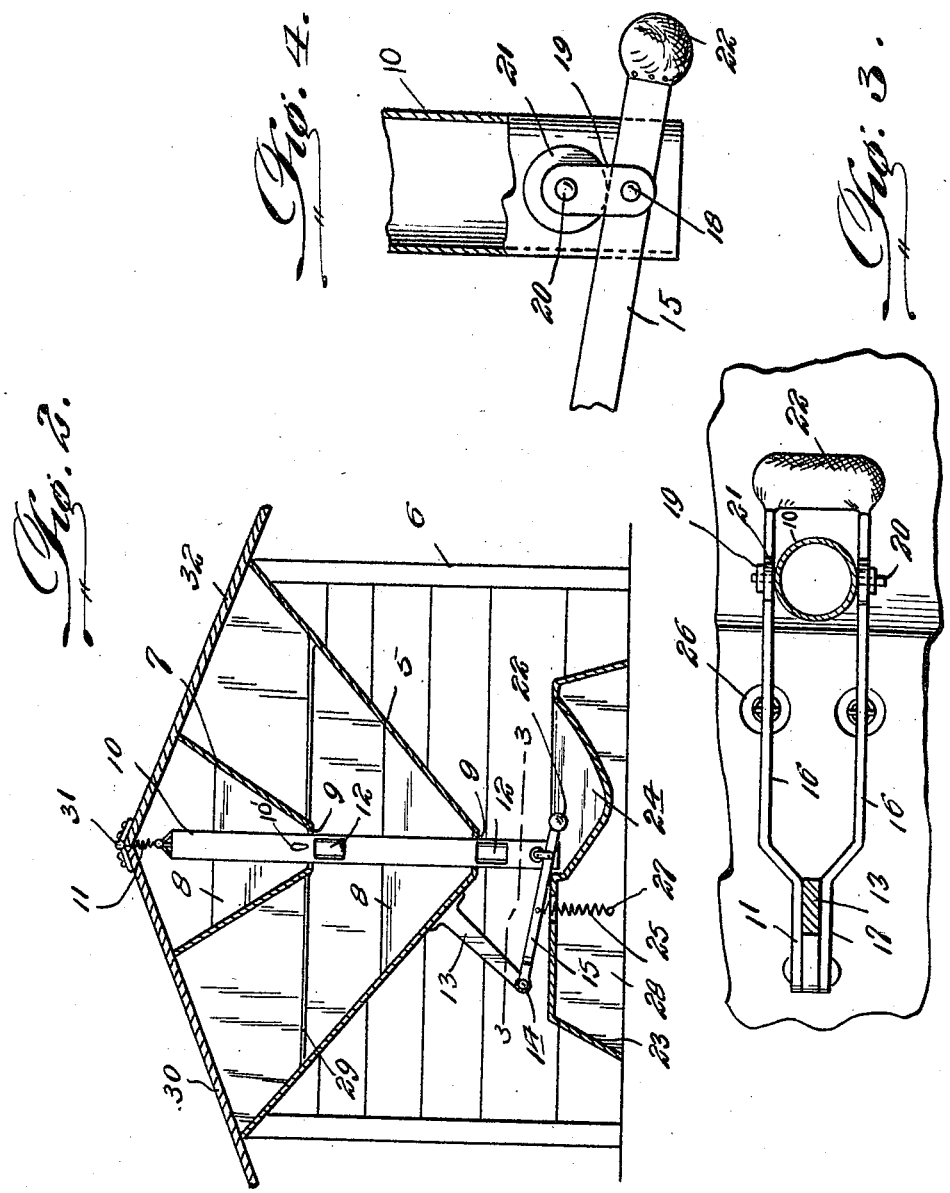

Patented May 1, 1923.

1,453,768

UNITED STATES PATENT OFFICE.

WILLIAM T. ROBBINS, OF MAYFIELD, KENTUCKY.

ANIMAL-CONTROL FEEDER.

Application filed January 16, 1923. Serial No. 612,941.

*To all whom it may concern:*

Be it known that I, WILLIAM T. ROBBINS, a citizen of the United States, residing at Mayfield, in the county of Graves and State of Kentucky, have invented certain new and useful Improvements in Animal-Control Feeders, of which the following is a specification.

My invention relates to improvements in animal feeders, and has for the primary object thereof, the provision of such a device that is adapted for holding a main feed such as corn or the like, and also a chemically treated feed, the same being automatically fed to a trough by the animals.

A further object of the invention resides in the provision of such a device that is of substantially simple construction, comparatively inexpensive of manufacture, and highly efficient in operation.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1—is a side elevational view of an animal feeder constructed in accordance with the present invention.

Figure 2—is a vertical transverse cross sectional view of the feeder shown in Figure 1.

Figure 3—is a transverse cross sectional view taken substantially upon the broken line 3—3 of Figure 2, and Figure 4—is an enlarged fragmentary view of the lower end of one of the feed conveying pipes, together with means for actuating the same.

With particular reference to the drawings, my improved feeder constitutes the provision of a main elongated feed hopper 5 of substantially V shape in cross section and supported above the ground, and at the opposite ends thereof by any suitable supporting means 6. Within this main hopper 5 and at the top thereof is an auxiliary feed hopper 7 of a length equivalent to the length of the main hopper 5, and also substantially V-shape in cross section, the hopper 7 being relatively smaller than the hopper 5 as clearly shown in Figure 2.

Within each hopper 5 and 7 there is disposed spaced transversely extending division plates 8, these plates in each of the hoppers being in vertical alinement with each other. Between adjacent division plates within each of the hoppers are formed openings 9, which are also in vertical alinement, as clearly shown in Figure 2.

Slidably disposed within alined openings of the hoppers 5 and 7, and between adjacent division plates 8, are vertically disposed hollow feed pipes 10, each of the same being resiliently supported as at 11 from the top of the feeder. The normal position of each of these hollow feed pipes 10 is as shown in Figures 1 and 2, and beneath the openings in the bottom wall of each of the hoppers 5 and 7, said pipes are formed with openings 12 at one side thereof, the portions of the pipes within the hopper 7 being formed with agitating prongs 10'.

Secured to the rear inclined wall of the lower hopper 5, and spaced from each opening 9 therein, are pendent arms 13, which have pivotally secured as at 14 to the lower end thereof, a feed tube control member 15. As more clearly shown in Figure 3, each of these feed tube control members 15 constitute the provision of a pair of spaced arms 16, the inner ends of which are bent inwardly as at 17 for having close contact with the said pendent arms 13. The arms 16 forming each of the feed tube control members 15 extend at opposite sides of the lower end of the hollow feed tubes 10, and are pivotally connected as at 18 to the lower end of vertical link members 19. The upper end of each of these link members 19 are loosely pivotally secured as at 20 to the feed tubes 10, this pivot 20 also carrying an anti-friction roller 21. The outer free ends of the arms 16 forming the control member 15 may be joined in any manner desirable, preferably by a cross arm, which has positioned thereover, a covering 22 of leather, cloth or the like for effecting a bumper upon the free end of each of the members 15 for purposes hereinafter more fully described.

Beneath the lower end of the hollow feed pipes 10 is a longitudinally extending inverted pan-shaped member 23, the bottom wall of which is formed with a depressed feed receiving trough 24, the forward end of which is directly beneath the said hollow feed pipes. Intermediate the ends of each of the arms 16 forming the feed tube control members 15, there is secured the upper end of coiled springs 25, which extend downwardly through openings 26 within the said inverted pan shaped member and are secured at their opposite ends upon a longitudinally extending rod 27, this rod being supported within the opposite end walls of the said inverted pan shaped member 23 and also within a suitable number of transverse partition walls 28 between the side walls of said pan member.

The main feed hopper 5 may be, and preferably is, strengthened by transverse cross rods 29, and upon the upper end of each of the hoppers 5 and 7, and at one side thereof, is a rigidly disposed top wall 30, to which is hingedly secured by spaced hinges 31 a swinging cover 32, which cover may be raised for filling the said hoppers 5 and 7.

As above set forth, the main hopper 5 is adapted to have received therein, the feed material, such as corn or the like, and within the hopper 7, there is placed a medically treated food, and the normal position of the hollow feed tubes is as shown in Figures 1 and 2, that is, the feed outlet openings 12 being normally disposed beneath the bottom wall of each of the hoppers. These feed tubes 10 are reciprocated vertically within the alined openings of the hoppers by an animal rooting within the trough 24, the nose of the animal engaging beneath the bumper 22, which will effectively control the upward movement of the feed tubes for bringing the openings 12 therein into the hoppers 5 and 7 for permitting the foods to engage therethrough into the said pipes for flowing into the trough 24.

While I have herein shown and described the preferred embodiment of the present invention, it is nevertheless to be understood that minor changes may be made therein, without departing from the spirit and scope of the invention as claimed.

What I claim as new is:

1. In an animal feeder of the class described including a main and auxiliary feed hopper, spaced alined openings within the bottom wall of the hoppers, a vertically movable hollow feed pipe disposed within these openings, inlet openings within said pipes and normally disposed beneath the bottom walls of said hoppers and animal controlled means for moving said pipes vertically for permitting the discharge of the feed from the hoppers into a trough beneath the lower ends of said feed pipes.

2. In an animal feeder of the class described, a pair of feed hoppers having spaced alined openings in the bottom walls thereof, feed pipes vertically movable within alined openings of the said hoppers and having feeding inlet openings therein and means for reciprocating said feed pipes for permitting discharge of the feed within the hoppers into a trough beneath the lower ends of said pipes.

3. In an animal feeder of the class described, a pair of feed hoppers, spaced vertically disposed feed pipes movable within alined openings in the bottom walls of said hoppers and having feed inlet openings therein, and animal actuated control arms connected to the lower ends of each of said feed pipes for reciprocating the same within the hoppers for permitting of the discharge of feed therefrom.

In testimony whereof I affix my signature.

WILLIAM T. ROBBINS.